United States Patent
Chiapuzzi et al.

(10) Patent No.: US 6,718,831 B2
(45) Date of Patent: Apr. 13, 2004

(54) SCREWER TEST BENCH COMPRISING A RESISTING TORQUE SIMULATION UNIT

(75) Inventors: Angelo Chiapuzzi, Noviglio (IT); Luigi Bareggi, Milan (IT)

(73) Assignee: BLM S.a.s. di L. Bareggi & C., Cusano Milanino (IT)

( * ) Notice: Subject to any disclaimer, the term of this patent is extended or adjusted under 35 U.S.C. 154(b) by 0 days.

(21) Appl. No.: 10/247,719

(22) Filed: Sep. 20, 2002

(65) Prior Publication Data

US 2003/0056605 A1 Mar. 27, 2003

(30) Foreign Application Priority Data

Sep. 25, 2001 (IT) ...................... MI2001A1990

(51) Int. Cl.[7] ............................... F18B 31/02
(52) U.S. Cl. ............................ 73/761; 73/760; 73/1.09; 73/862.08
(58) Field of Search .................. 73/760, 761, 862.08, 73/1.09, 862.21, 862.22, 862.23

(56) References Cited

U.S. PATENT DOCUMENTS

| | | | |
|---|---|---|---|
| 5,886,246 A | * | 3/1999 | Bareggi et al. ............... 73/1.09 |
| 2003/0056564 A1 | * | 3/2003 | Chiapuzzi et al. ........... 73/1.09 |
| 2003/0057034 A1 | * | 3/2003 | Chiapuzzi et al. .......... 188/71.1 |

* cited by examiner

Primary Examiner—Edward Lefkowitz
Assistant Examiner—Alandra N. Ellington
(74) Attorney, Agent, or Firm—Jacobson Holman PLLC

(57) ABSTRACT

A screwer test bench includes a coupling designed for coupling with the head of a screwer. The coupling is connected to a braking unit through a sensor unit for detection of mechanical magnitudes transmitted between the coupling and the braking unit. The braking unit includes a cap connected to the coupling and a movable member thrust on command in the brake operation direction. The movable member is constrained against rotation around the brake axis by an inextensible wall with a configuration deformable in the braking direction. Advantageously the wall is in the form of a bellows into which is fed pressurized fluid to bring about its elongation and operate the brake.

12 Claims, 3 Drawing Sheets

Tav. III

SCREWER TEST BENCH COMPRISING A RESISTING TORQUE SIMULATION UNIT

BACKGROUND OF THE INVENTION

The present invention relates to a screwer test bench and in particular to a bench with a resisting torque simulation unit realized with a friction brake.

In the prior art screwer test benches are well known. Such benches simulate the resisting torque of a screw in tightening and at the same time measure the parameters of torque and angle developed by a screwer applied to the bench and signal deviations of said parameters from a predetermined characteristic curve.

In such benches correct simulation of resisting torque is the most critical part in order that the measurements made be truly representative of the operation of the screwer in normal use.

In accordance with a known system the bench comprises a cap to which is engaged the screwer being tested. A friction disk is thrust against the cap by means of a hydraulic cylinder to produce the braking force. Naturally as all the torque produced by the screwer is discharged onto the friction disk this disk must be locked against axial rotation. As the thrust cylinder cannot offer any resistance to rotation, the disk runs along purposeful guides which prevent its rotation so it can move only axially to draw near the cap to be braked.

The holder of this application has noted however that this simple structure involves some problems in the generation of the braking ramp and consequently in the accuracy of the measurements made with the bench.

Indeed, in benches made in this manner there have been found measurement oscillations in particular near the stop. These oscillations are due mainly to the braking system structure used.

Indeed, there is play even if small in the coupling between the disk and guides which is indispensable for allowing free axial running of the disk along the guides. It was found that this play during braking simulation generates oscillations of a cyclic nature which alter braking linearity.

The general purpose of the present invention is to remedy the above mentioned shortcomings by making available a screwer test bench free of measurement uncertainty problems caused by vibration and oscillations produced by the known braking systems described.

SUMMARY OF THE INVENTION

In view of this purpose it was sought to provide in accordance with the present invention a screwer test bench comprising a coupling connected to a braking unit and designed for coupling with the head of a screwer, and a sensor unit detecting mechanical magnitudes transmitted between the coupling and the braking unit and the braking unit comprising a friction brake with braking surfaces which upon operation of the brake are thrust upon command one against the other in a braking direction characterized in that the brake has a movable thrust member of said braking surfaces in said braking direction which is constrained against rotation around the brake axis by means of an inextensible wall with configuration deformable in said braking direction.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
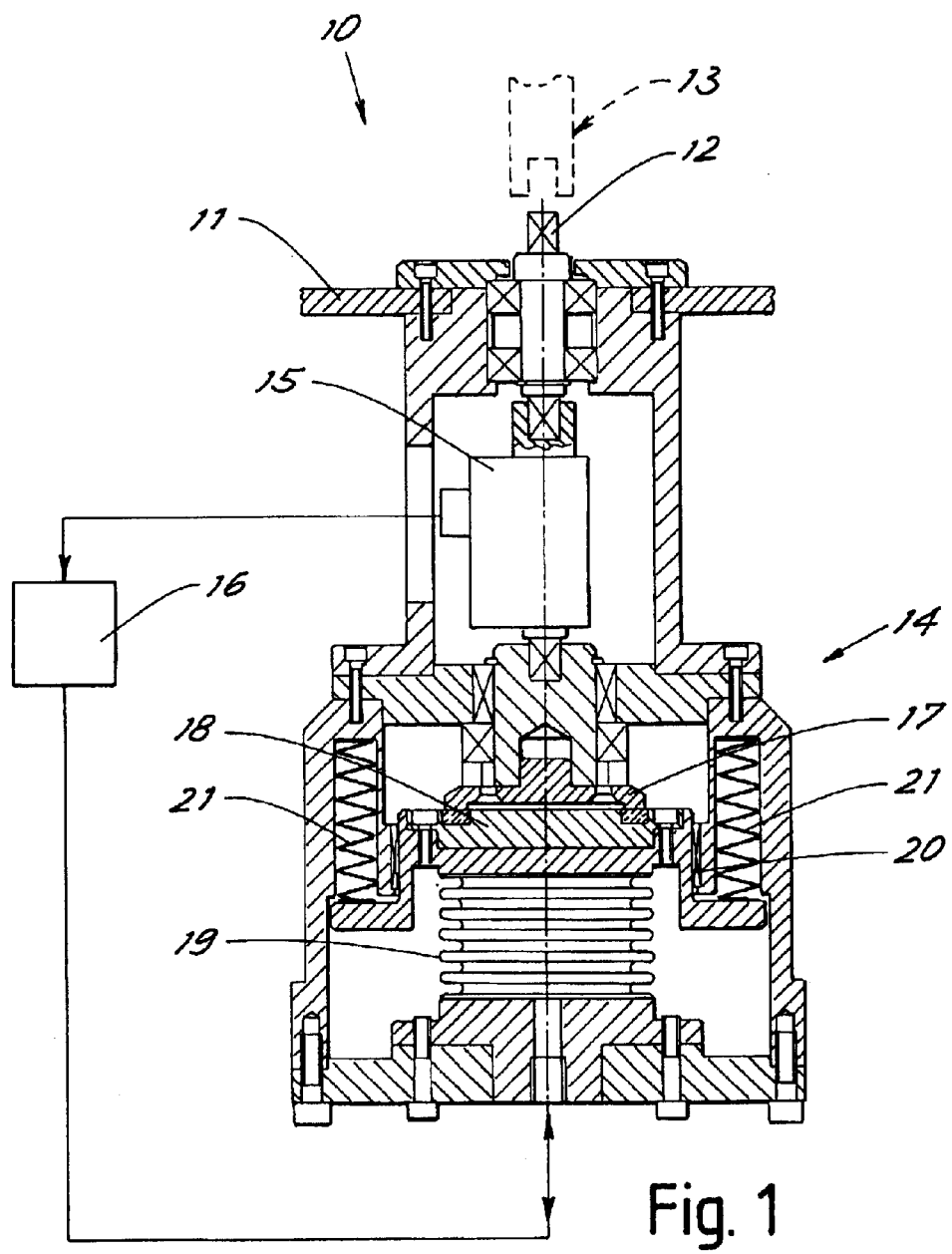
FIG. 1 shows a diagrammatic cross section view of a first embodiment of a test bench in accordance with the present invention.

With reference to the FIGS., FIG. 1 shows diagrammatically a cross section of a first test bench designated as a whole by reference number 10. From the bench top 11 projects a known coupling 12 designed for coupling with the head 13 of a known screwer to be tested.

The coupling 12 is connected to a braking unit 14 with the interposition of a known sensor unit 15 for detection of mechanical magnitudes such as torque and angle transmitted from the coupling to the braking unit. The sensor unit is connected to an acquisition and control device 16, for example with microprocessor, of the prior art and therefore not further shown nor described. During the testing phases of a screwer the device 16 appropriately commands the braking unit 14 and detects through the sensor unit 15 the characteristics of the screwer to establish the correspondence of the screwer to established testing parameters. These measurements and verifications are known to those skilled in the art and therefore not further described nor shown.

The braking unit 14 comprises braking surfaces which are thrust one against the other by means of a disk or movable member 18 which is commanded to move by the device 16 by means of an actuator. In particular, the brake comprises a cap 17 caused to rotate by the screwer which is braked on command by the action of the disk or movable member 18 thrust against it.

For thrusting of the disk 18 against the cap 17 the braking unit comprises a wall 19 which is inextensible but with deformable configuration in the direction of thrust of the brake. In the embodiment of FIG. 1 this wall is made in the form of a tubular bellows arranged between the disk and the bench frame. The wall is made of material designed to offer torsional rigidity against the rotation torque imparted by the screwer. For example, it was found advantageous to realize the wall of thin stainless steel sheet.

The bellows is built to be tight to form an internal chamber into which is fed control fluid or oil under pressure through the device 16. The fluid acts in a uniform manner on the entire internal surface of the bellows to cause axial thrust proportionate to the mean diameter of the bellows and to the oil pressure while the thrust on the side wall is absorbed by the corrugated ribbing of the bellows with only a small elastic expansion.

It should be noted that the disk 18 is supported on the bench frame through an axial collar 20 which however does not obstruct rotation of the disk. The rotation torque is virtually opposed by the torsional rigidity of the bellows. The high torsional rigidity of the bellows cancels out the need for stout guides or reaction pins which are indispensable in the prior art embodiments using a normal hydraulic cylinder.

To ensure return of the bellows to the initial position there are springs 21 which thrust the guide collar integral with the bellows. A secondary duty of the springs is to ensure through regulation of the oil pressure when at rest that the friction material of the disk is in a constant position and at a short distance from the rotating cap so as to reduce to a minimum the working travel and thus save oil and initiate the braking ramp smoothly and without abrupt contacts.

Figure 2:
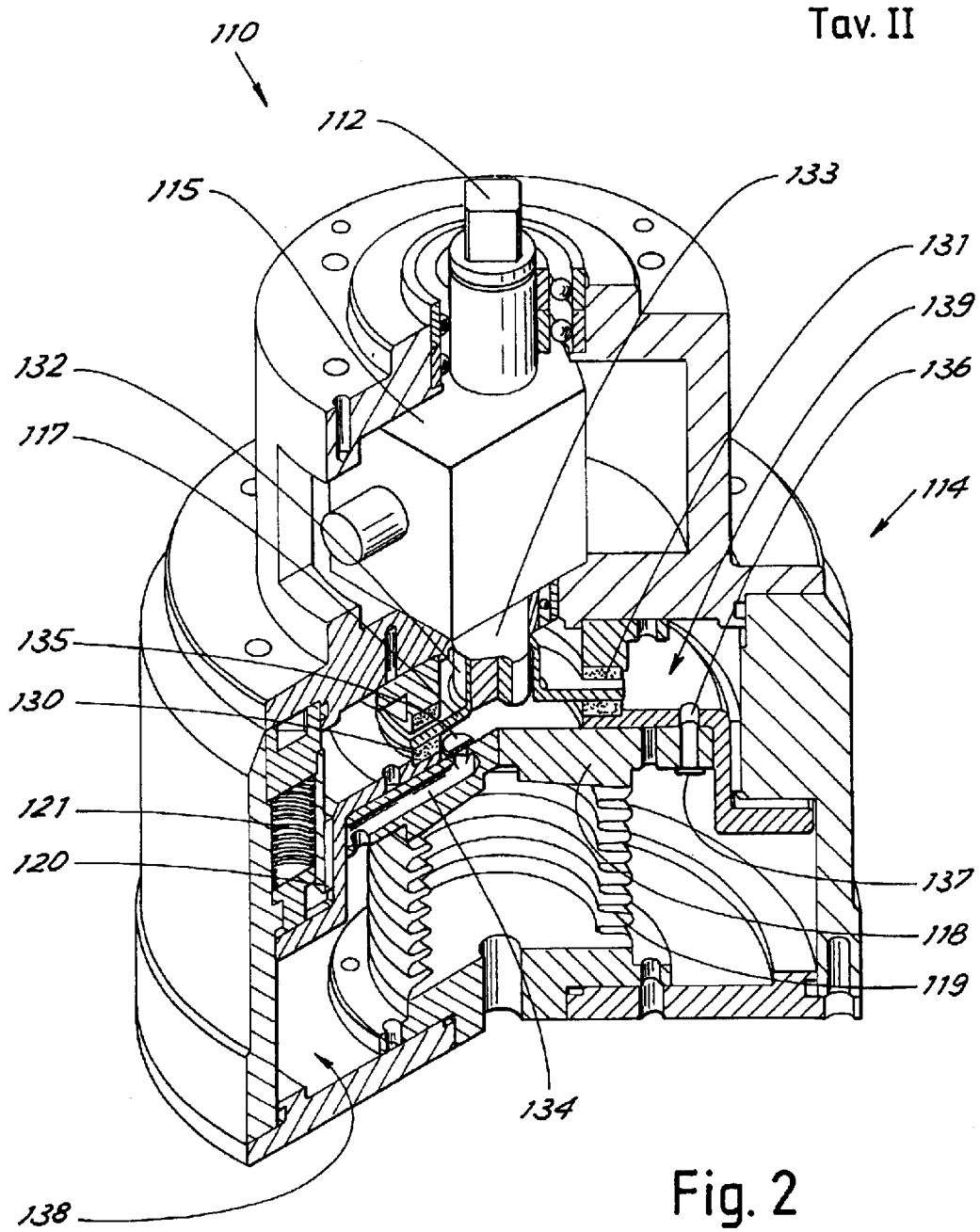
FIG. 2 shows a diagrammatic cross section view of a second embodiment of a test bench in accordance with the present invention.

FIG. 2 shows a variant of the bench of FIG. 1. For the sake of convenience, in FIG. 2 the details similar to those of FIG. 1 are designated by the same numbering increased by 100.

There is thus a bench 110 having a coupling 112 designed for coupling with the head of a screwer to be tested. The coupling 112 is connected to a braking unit 114 and to a known sensor unit 115 for detection of mechanical magnitudes such as torque and angle transmitted by the coupling to the braking unit. The sensor unit is also connected to an acquisition and control device 16 as shown in FIG. 1.

The braking unit 114 comprises a cap 117 made to rotate by the screwer which is braked by the action of a disk or movable member 118 which is commanded by the device 16 to press against the cap by means of a bellows 119 supplied with fluid by the device 16. As for the above embodiment, the bellows is made of material such as thin stainless steel sheet deigned to offer torsional rigidity against the rotation torque imparted by the screwer. Springs 121 aid return to the rest position of the brake while a running collar coupling 120 guides movement of the disk 118.

In the embodiment of FIG. 2 the disk 118 is a thrust disk which thrusts with its surface 130 against the cap 117 to shift it to a fixed braking surface 131 arranged on the other face of the cap. For free axial movement the cap is coupled to the shaft 133 by means of an axially running union 132. The thrust and braking surfaces of the cap are annular.

As the cap is subject to balanced pressure on its two faces it can be made of thin material with the advantage of lowering brake inertia. This makes bench measurements more accurate.

The surfaces 130, 131 can both be friction surfaces. In some cases, to reduce axial rotation torques transmitted by the brake to the bellows it was found advantageous that the surface 130 moved by the bellows be made of a low friction material such as for example Teflon® while the fixed surface 131 is made of material to supply suitable braking friction. The cap can be made of steel.

It was also found advantageous to keep the brake in an oil bath. In this case the increase in volume of the bellows reaching end of travel can also be used to produce circulation of the oil bath. For this purpose the bellows 119 is contained in a chamber 138 which is separated from the chamber 139 in which the brake is contained. The running coupling 120 is made with a hydraulic seal. Both the chambers are filled with oil and are connected by a first and a second passages 134, 136 made in the disk 118. The passages 134, 136 are equipped with opposed one-way valves 135, 137 respectively. Thus expansion of the bellows pumps oil from the chamber 138 to the chamber 139 through one of the two passages and the subsequent contraction of the bellows pumps oil in the opposite direction through the other passage. The first passages open into the chamber in the zone inside the annular surface of the brake while the second passages open into the chamber in the zone outside the annular surface of the brake so that oil circulation traverses the brake. The direction of movement of the fluid allows removal of any impurities from the inside of the brake. In addition, the centrifugal force aids this movement.

Figure 3:
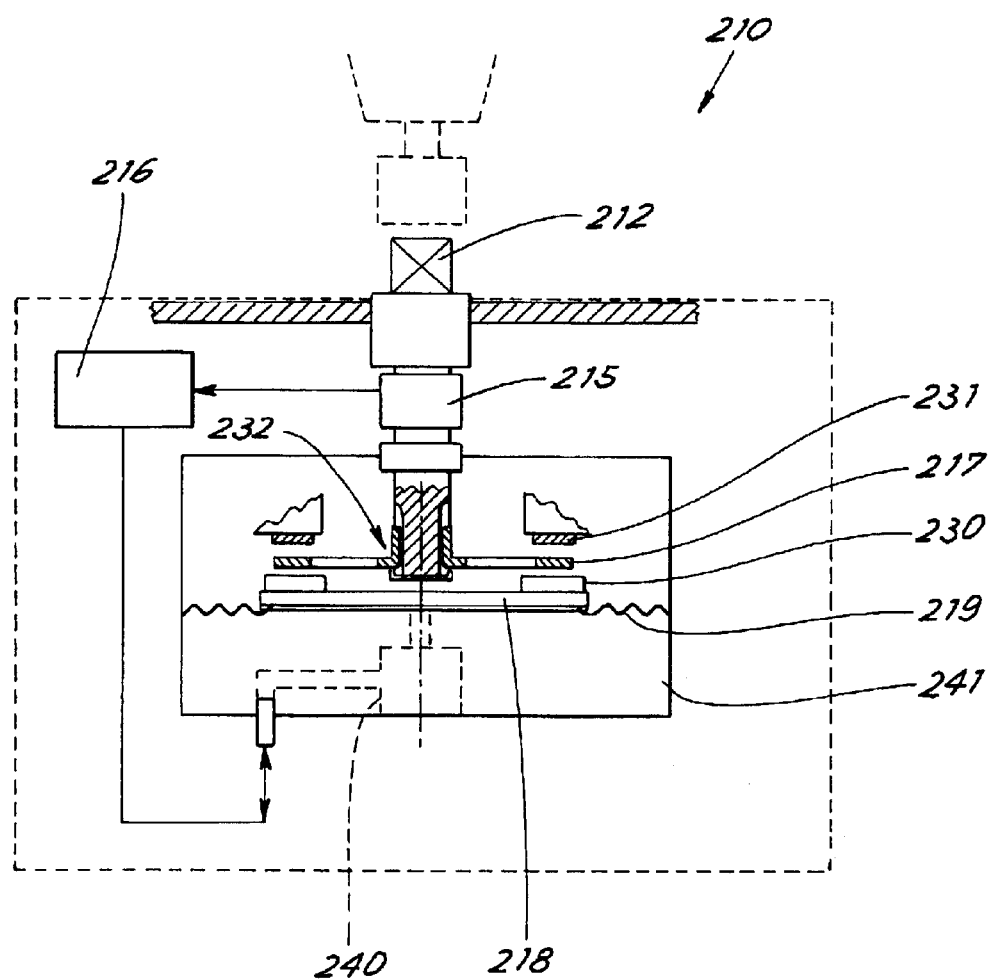
FIG. 3 shows a diagrammatic cross section view of a third embodiment of a test bench in accordance with the present invention.

FIG. 3 shows another embodiment of a test bench in accordance with the present invention. In this embodiment the bench 210 equipped with a coupling 212 for the screwer is connected to a braking unit 214. A known sensor unit 215 detects the mechanical magnitudes such as torque and angle transmitted by the coupling to the braking unit and transmits them to the acquisition and control device 216 which controls the braking unit.

The braking unit 214 comprises a cap 217 made to rotate by the screwer which is braked by the action of a disk or movable member 218 which pushes the cap (running on the shaft) against opposing fixed braking surfaces 231. Between the cap 217 and the disk 218 there are running surfaces 219.

The disk 218 is supported by an inextensible wall 219 with deformable configuration in the brake operation direction. In the particular embodiment the wall has a virtually flat extension transversal to the brake operation direction and with deformation undulations arranged concentric to the brake rotation axis. The wall is supported peripherally. The wall can close a chamber 241 into which the device 216 feeds fluid under pressure to deform the wall of the chamber outwardly and thus operate the brake. As an alternative there can be provided an actuator 240 which pushes the disk 218 against the cap while the deformable wall offers resistance to the twisting torque transmitted by the brake to the disk 218.

The natural elasticity of the wall allows return of the disk 218 into the rest position when fluid pressure is removed.

As for the above embodiments, the wall 219 is made of suitable material such as thin stainless steel sheet. It is now clear that the predetermined purposes have been achieved by making available a screwer test bench providing high precision and repeatability of measurement without uncertainties and at the same time having a simple and strong structure.

Indeed, it was found that benches with deformable walls in accordance with the present invention completely eliminate those braking simulation defects especially in the most critical and delicate phases immediately before stopping of the screwer while eliminating virtually all vibrations and uncertainties which were produced by the mechanics of the braking unit of known benches.

Another advantage of the solution in accordance with the present invention is that the use of a bellows or wall system allows considerable reduction of oil consumption which is high and cannot be eliminated with known benches because of the oil blow-by in conventional compressed air cylinders of the gasketless type. On the other hand, in prior art systems satisfactory use of cylinders with sealing gaskets is not possible because of the friction thereof and resulting high hysteresis of the system. The thrust would not be sufficiently linear with the pressure increase.

Oil consumption of known benches requires frequent accumulator recharging and hence undesirable energy consumption. In addition, in the solution in accordance with the present invention the high cost of gasketless cylinders is eliminated.

Naturally the above description of an embodiment applying the innovative principles of the present invention is given by way of non-limiting example of said principles within the scope of the exclusive right claimed here. For example the exact structure and proportions of the various parts of the bench as well as the existence or not of other prior art parts may vary depending on the specific requirements of the bench embodiment.

What is claimed is:

1. Screwer test bench comprising a coupling connected to a braking unit and designed for coupling with the head of a screwer, and a sensor unit detecting mechanical magnitudes transmitted between the coupling and the braking unit and the braking unit comprising a friction brake with braking surfaces which upon operation of he brake are thrust upon command one against the other in a braking direction, the brake has a movable thrust member of said braking surfaces in said braking direction which is constrained against rotation around the brake axis by means of an inextensible wall with configuration deformable in said braking direction.

2. Bench in accordance with claim 1, wherein the movable member runs in an axial guide collar.

3. Bench in accordance with claim 1, wherein said wall is virtually extended in the plane transversal to said braking direction and is supported peripherally and has a movable member arranged centrally.

4. Bench in accordance with claim 1, wherein said wall is realized of steel sheet.

5. Bench in accordance with claim 1, wherein said wall is in the form of a bellows with axis directed in the braking direction while into the bellows is fed upon command pressurized fluid to produce its elongation and thrust the movable member in the braking direction.

6. Bench in accordance with claim 5, wherein the braking surfaces are annular rims and the circulation passages comprise first passages which lead into the first chamber containing the brake in the zone external to the annular surfaces and second passages lead into the first chamber containing the brake in the zone inside the annular surfaces with first and second passages being equipped with opposing one-way valves.

7. Bench in accordance with claim 1, wherein the brake comprises cap rotatably integral with the coupling and with one face facing the moveable member and the other face facing fixed braking surfaces with the movable member thrusting the cap against said fixed braking surfaces upon operation of the brake.

8. Bench in accordance with claim 7, wherein to be deformable said wall has undulations concentric with the brake rotation axis.

9. Bench in accordance with claim 1, wherein said wall encloses a chamber into which is fed on command pressurized fluid to bring about deformation of its wall in the direction of braking and operate the brake.

10. Bench in accordance with claim 9, wherein the bellows thrusts the disk against he reacting force of the return springs.

11. Bench in accordance with claim 9, wherein the braking surfaces are contained in a first chamber and the bellows is contained in a second chamber with the two chambers being filled with oil and interconnected with each other by oil circulation passages with a radial expansion of the bellows caused by the pressurized fluid fed therein causing oil circulation between the chambers through said passages.

12. Bench in accordance with claim 11, wherein the first and second chambers are separated by the movable member.

* * * * *